(12) United States Patent
Lipton et al.

(10) Patent No.: US 7,796,780 B2
(45) Date of Patent: Sep. 14, 2010

(54) TARGET DETECTION AND TRACKING FROM OVERHEAD VIDEO STREAMS

(75) Inventors: Alan J. Lipton, Herndon, VA (US);
Peter L. Venetianer, McLean, VA (US);
Zhong Zhang, Herndon, VA (US);
Haiying Liu, Chantilly, VA (US);
Zeeshan Rasheed, Sterling, VA (US);
Himaanshu Gupta, Herndon, VA (US);
Li Yu, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 801 days.

(21) Appl. No.: 11/165,435

(22) Filed: Jun. 24, 2005

(65) Prior Publication Data

US 2006/0291695 A1    Dec. 28, 2006

(51) Int. Cl.
*G06K 9/00* (2006.01)
*H04N 7/18* (2006.01)
*H04N 5/225* (2006.01)

(52) U.S. Cl. .................... 382/103; 348/143; 348/169

(58) Field of Classification Search ................. 382/103, 382/104, 197, 228, 107; 345/419; 348/143–160, 348/169–172
See application file for complete search history.

(56) References Cited

U.S. PATENT DOCUMENTS

| | | | |
|---|---|---|---|
| 6,263,088 B1 * | 7/2001 | Crabtree et al. | 382/103 |
| 6,545,706 B1 * | 4/2003 | Edwards et al. | 348/169 |
| 6,625,310 B2 | 9/2003 | Lipton et al. | |
| 6,639,593 B1 * | 10/2003 | Yhann | 345/419 |
| 6,696,945 B1 | 2/2004 | Venetianer et al. | |
| 6,856,696 B1 | 2/2005 | Ajioka | |
| 2001/0015409 A1 | 8/2001 | Mahler et al. | |
| 2003/0165193 A1 * | 9/2003 | Chen et al. | 375/240.08 |
| 2003/0235327 A1 * | 12/2003 | Srinivasa | 382/104 |
| 2004/0151342 A1 | 8/2004 | Venetianer et al. | |
| 2005/0104958 A1 | 5/2005 | Egnal et al. | |
| 2005/0146605 A1 | 7/2005 | Lipton et al. | |
| 2005/0162515 A1 | 7/2005 | Venetianer et al. | |
| 2005/0169367 A1 | 8/2005 | Venetianer et al. | |
| 2006/0170769 A1 | 8/2006 | Zhou | |
| 2006/0268111 A1 | 11/2006 | Zhou | |
| 2006/0291695 A1 | 12/2006 | Lipton | |
| 2007/0003141 A1 | 1/2007 | Rittscher et al. | |
| 2007/0013776 A1 | 1/2007 | Venetianer et al. | |
| 2007/0279494 A1 | 12/2007 | Aman et al. | |
| 2008/0107304 A1 | 5/2008 | Coulter et al. | |

OTHER PUBLICATIONS

Chen et al., "An Automatic Bi-Directional Passing-People Counting Method Based on Color Image Processing", IEEE, 2003, pp. 200-207.*

(Continued)

*Primary Examiner*—Aaron W Carter
(74) *Attorney, Agent, or Firm*—Venable LLP; Jeffri A. Kaminski; Michael A. Sartori

(57) ABSTRACT

A technique for video processing includes: receiving video from an overhead view of a scene; detecting moving pixels in the video; detecting line segments in the video based on detected moving pixels; identifying targets in the video based on the detected line segments; tracking targets in the video based on the identified targets; and managing tracked targets in the video.

12 Claims, 16 Drawing Sheets

OTHER PUBLICATIONS

International Search Report dated Apr. 5, 2007 issued in Application No. PCT/US06/24485.
U.S. Appl. No. 11/139,986, filed May 31, 2005, Zhong Zhang et al.
U.S. Appl. No. 11/113,275, filed Apr. 25, 2005, Zhong Zhang et al.
U.S. Appl. No. 11/139,600, filed May 31, 2005, Zhong Zhang et al.
Chris Stauffer et al., "Learning Patterns of Activity Using Real-Time Tracking", IEEE Transactions on Patterns Analysis and Machine Intelligence, vol. 22, No. 8, Aug. 2000, pp. 747-757.
Robert T. Collins et al., "Algorithms for Cooperative Multisensor Surveillance", Proceedings of the IEEE, vol. 89, No. 10, Oct. 2001, pp. 1456-1477.
"Real-Time Tracking of the Human Body", available at http://vismod.media.mit.edu/vismod/demos/pfinder, Jun. 24, 2005.
Office Action dated Nov. 19, 2009 in U.S. Appl. No. 11/700,007.

* cited by examiner

US 7,796,780 B2

TARGET DETECTION AND TRACKING FROM OVERHEAD VIDEO STREAMS

FIELD OF THE INVENTION

The invention relates to video surveillance systems and video verification systems. Specifically, the invention relates to a video surveillance system that may be configured to detect and track individual targets in video streams from an overhead camera view.

BACKGROUND OF THE INVENTION

Video surveillance is of critical concern in many areas of life. One problem with video as a surveillance tool is that it may be very manually intensive to monitor. Recently, solutions have been proposed to the problems of automated video monitoring in the form of intelligent video surveillance systems. See, for example, U.S. Pat. No. 6,696,945, "Video Tripwire," and U.S. patent application Ser. No. 09/987,707, "Surveillance System Employing Video Primitives," both of which are incorporated herein by reference. One application of video surveillance is the detection of human beings and their behaviors. Unfortunately, the science of computer vision, which is behind automated video monitoring, has limitations with respect to recognizing individual targets in overhead camera views, such as those used in residential, commercial, and home monitoring applications.

Current video surveillance systems (see, for example, C. Stauffer, W. E. L. Grimson, "Learning Patterns of Activity Using Real-Time Tracking," IEEE Trans. PAMI, 22(8):747-757, August 2000; and R. Collins, A. Lipton, H. Fujiyoshi, and T. Kanade, "Algorithms for Cooperative Multisensor Surveillance," Proceedings of the IEEE, Vol. 89, No. 10, October, 2001, pp. 1456-1477, both of which are incorporated herein by reference) have two basic limitations. First, groups of targets may often be crowded together and detected as a single "blob." The blob may be correctly labeled as "human group," but the number of individuals comprising the group may not be ascertained. Second, other inanimate objects, such as, for example, furniture, strollers, and shopping carts, may generally not be disambiguated from legitimate targets (particularly in, for example, overhead camera shots). In addition, other "human detection" algorithms (see, for example, the techniques discussed at and U.S. patent application Ser. No. 11/139,986, "Human Detection and Tracking for Security Applications," filed May 31, 2005, both of which are incorporated herein by reference) rely on more oblique camera views and specific human models to recognize humans, but generally do not perform well for overhead camera views.

SUMMARY OF THE INVENTION

One embodiment of the invention includes a computer-readable medium comprising software for video processing, which when executed by a computer system, cause the computer system to perform operations comprising a method of: receiving video from an overhead view of a scene; detecting moving pixels in the video; detecting line segments in the video based on detected moving pixels; identifying targets in the video based on the detected line segments; tracking targets in the video based on the identified targets; and managing tracked targets in the video.

One embodiment of the invention includes a computer-based system to perform a method for video processing, the method comprising: receiving video from an overhead view of a scene; detecting moving pixels in the video; detecting line segments in the video based on detected moving pixels; identifying targets in the video based on the detected line segments; tracking targets in the video based on the identified targets; and managing tracked targets in the video.

One embodiment of the invention includes a method for video processing comprising: receiving video from an overhead view of a scene; detecting moving pixels in the video; detecting line segments in the video based on detected moving pixels; identifying targets in the video based on the detected line segments; tracking targets in the video based on the identified targets; and managing tracked targets in the video.

BRIEF DESCRIPTION OF THE DRAWINGS

The foregoing and other features and advantages of the invention will be apparent from the following, more particular description of the embodiments of the invention, as illustrated in the accompanying drawings.

DEFINITIONS

Figure 1:
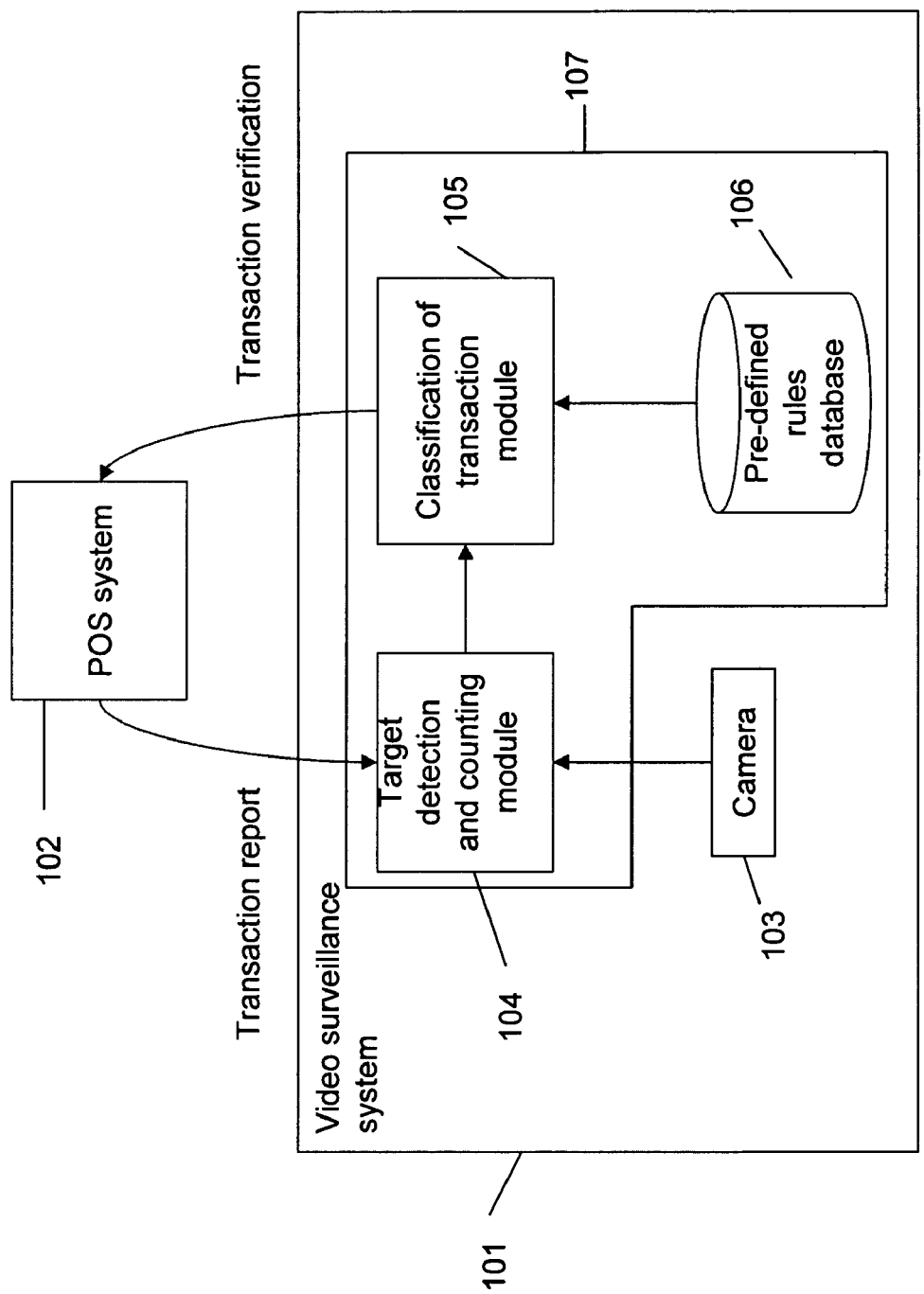
FIG. 1 illustrates a video surveillance system according to an exemplary embodiment of the invention.

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor or multiple processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP) or a field-programmable gate array (FPGA); a distributed computer system for processing information via computer systems linked by a network; two or more computer systems connected together via a network for transmitting or receiving information between the computer systems; and one or more apparatus and/or one or more systems that may accept data, may process data in accordance with one or more stored software programs, may generate results, and typically may include input, output, storage, arithmetic, logic, and control units.

"Software" may refer to prescribed rules to operate a computer. Examples of software may include software; code segments; instructions; computer programs; and programmed logic.

A "computer system" may refer to a system having a computer, where the computer may include a computer-readable medium embodying software to operate the computer.

A "network" may refer to a number of computers and associated devices that may be connected by communication facilities. A network may involve permanent connections such as cables or temporary connections such as those made through telephone or other communication links. Examples of a network may include: an internet, such as the Internet; an intranet; a local area network (LAN); a wide area network (WAN); and a combination of networks, such as an internet and an intranet.

"Video" may refer to motion pictures represented in analog and/or digital form. Examples of video may include television, movies, image sequences from a camera or other observer, and computer-generated image sequences. Video may be obtained from, for example, a live feed, a storage device, an IEEE 1394-based interface, a video digitizer, a computer graphics engine, or a network connection.

A "video camera" may refer to an apparatus for visual recording. Examples of a video camera may include one or more of the following: a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan, tilt, zoom (PTZ) camera; and a video sensing device. A video camera may be positioned to perform surveillance of an area of interest.

"Video processing" may refer to any manipulation and/or analysis of video, including, for example, compression, editing, surveillance, and/or verification.

A "frame" may refer to a particular image or other discrete unit within a video.

DETAILED DESCRIPTION OF THE EMBODIMENTS

In describing the exemplary embodiments of the present invention illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose. Each reference cited herein is incorporated by reference.

The invention relates to a video surveillance system that may be configured to detect and track individual targets in video streams from an overhead camera view and to a video verification system that may be configured to verify the occurrences being monitored. The system may be adapted to disambiguate multiple objects even when they interact in tight groups and to detect moving objects in the presence of other inanimate objects, such as moving shopping carts, strollers, moving furniture, and other items.

The invention may be used in a variety of applications. In a residential or commercial setting, the invention may be used to detect humans and reduce false alarms in a residential or commercial monitoring system. In a commercial setting, the invention may be used to determine building occupancy by counting individuals entering and leaving an area and/or to detect if "piggybacking" occurred (i.e., to detect an access control violation when two people enter or exit through a portal when only one may be authorized to do so). For physical security, the invention may be used to detect people moving the "wrong way" in a one way corridor, such as, for example, an airport exit or public transport escalator. For public safety, the invention may be used to detect people interacting in a dangerous way, such as, for example, a mugging or a drug deal. In a retail setting, the invention may be used to detect store occupancy, detect queue length at a checkout lane, or verify a point of sale (POS) transaction. In a public transportation setting, the invention may be used to count people entering a public transportation facility or vehicle and to perform video surveillance of a ticket reader to ensure that there is a ticket scanned when a person enters an area (e.g., to prevent a person from jumping over a turnstile, or overcoming another such obstacle).

As an exemplary embodiment, the invention may be used to verify the legitimacy of several classes of retail point of sale (POS) transactions. For example, a "merchandise return" transaction may require that a customer be physically present. As another example, a "manager override" transaction may require that a manager assist the cashier. The video surveillance system of the invention may monitor the locations and number of individuals around the POS console (e.g., the cash register) and determine if an appropriate configuration of people is present at the time of a particular transaction.

Figure 2:
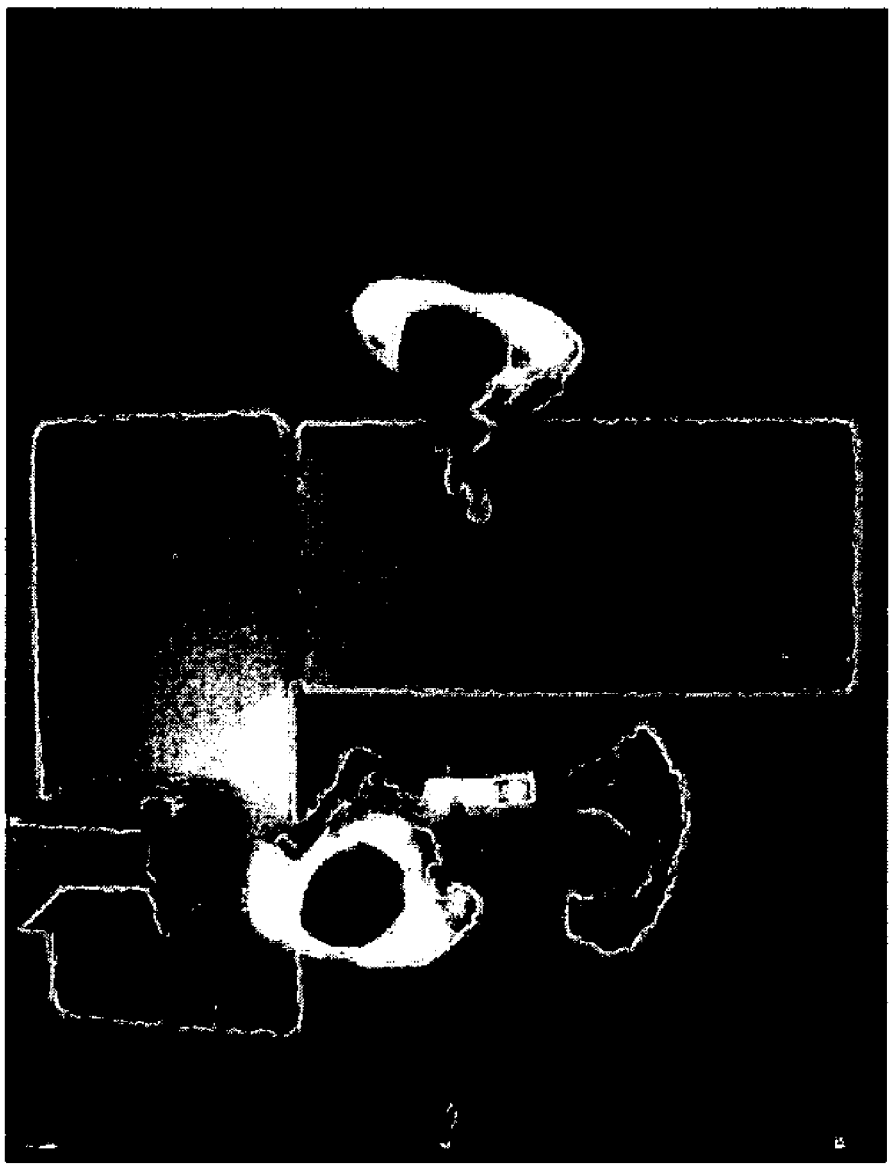
FIG. 2 illustrates an exemplary frame from a video stream from the video surveillance system according to an exemplary embodiment of the invention.

In FIGS. 1 and 2, the invention is illustrated for use in retail with a POS transaction verification application. FIG. 1 illustrates the video surveillance system according to this exemplary embodiment of the invention. For an exemplary POS setting, the video surveillance system 101 of the invention may interact with a POS system 102. The video surveillance system 101 may include a video camera 103, a target (e.g., human) detection and counting module 104, a classification of transaction (valid/invalid) module 105, and a pre-defined rules database 106.

The video camera 103 may overlook the console of the POS system from an overhead position. The field of view of the video camera 103 may be looking down on the scene. The target detection and counting module 104 may receive input from the POS system 102 as a transaction report that a particular transaction is requested, underway, or has been completed. The target detection and counting module 104 may determine the number of humans, if any, in the video scene. An exemplary embodiment of the target detection and counting module 104 is discussed below with respect to FIGS. 4-16. The classification of transaction module 105 may determine the constellation of participants based on the rules received from the pre-defined rules database 106. The system 101 may then provide a transaction verification message back to the POS system 102 (or some other data monitoring or archiving system) to indicate whether the transaction was legitimate or not.

Blocks 105 and 106 may be implemented using the techniques discussed in, for example, U.S. patent application Ser. No. 09/987,707, "Video Surveillance System Employing Video Primitives," U.S. patent application Ser. No. 11/057,154, "Video Surveillance System," or U.S. patent application Ser. No. 11/098,385, "Video surveillance system employing video primitives," which are incorporated herein by reference. In these documents, the creation of rules and the performance of activity inference (e.g., people counting) are discussed. For this invention, for example, human target primitives, as discussed in, for example, U.S. patent application Ser. No. 09/987,707, "Video Surveillance System Employing Video Primitives," may be used.

For the example of a POS system, a primitive called a "POS transaction primitive" may be used. This primitive may contain three data items: (1) the time of a POS transaction; (2) the location (which POS terminal) of the transaction; and (3) the type of transaction (sale, return, manager override, etc). Two rules for the rules database 106 may be used with the POS transaction primitive. Firstly a "return transaction verification" rule may be used as follows: if a POS return transaction (primitive) is registered; and there has been no customer present (>=human in a "customer" area of interest) for a [parameter] period of time; or there has been no cashier present (>=1 human present in an "employee" area of interest) for a [parameter] period of time, then the transaction is invalid and an alarm condition is generated. Secondly, a "manager override" transaction rule that says the following: if a POS manager override transaction (primitive) is registered; and there have not been two employees present (>1 human in an "employee" area of interest) for a [parameter] period of time; then the transaction is invalid and an alarm condition is generated.

The video camera 103 may be connected to a computer-based system 107 that may perform analysis of the video from the video camera 103 to determine the locations and number of people in the scene. Examples of the computer-based system 107 may include the following: a computer, as defined above; a personal computer (PC), a laptop, a personal digital assistant (PDA), a digital signal processor (DSP), an application specific integrated circuit (ASIC), a field programmable array (FPGA), a microcontroller; or any other form-factor processor either as a standalone device or embedded in a video camera, a digital video recorder (DVR), a network video recorder (NVR), a network switcher, a network router, a POS terminal, or any other hardware device. The computer-based system 107 may include the human detection and counting module 104, the classification of transaction module 105, and the pre-defined rules database 106. The computer-based system 107 may be implemented with one or more computers employing software and connected to a network. Alternatively, the computer-based system 107 may be incorporated in whole or in part into the video camera 103. The human detection and counting module 104 and the classification of transaction module 105 may be implemented as a computer-readable medium comprising software to perform the operations of the modules 104 and 105, such that when the software is executed by a computer system, the computer system may be caused to perform the operations of the modules 104 and 105. Alternatively, the human detection and counting module 104 and the classification of transaction module 105, and the pre-defined rules database 106 may be implemented with application-specific hardware to emulate a computer and/or software.

FIG. 2 illustrates an exemplary frame from a video stream from the video surveillance system according to an exemplary embodiment of the invention. The exemplary camera view may be from a video camera positioned overhead. In the exemplary frame, the customer is on the right, and two employees, namely a cashier and a manager, are on the left.

In the example of FIGS. 1 and 2, the invention is illustrated for use in retail with a POS transaction verification application. However, it is understood that the invention may be applied to any appropriate application as those skilled in the art will recognize.

Figure 3:
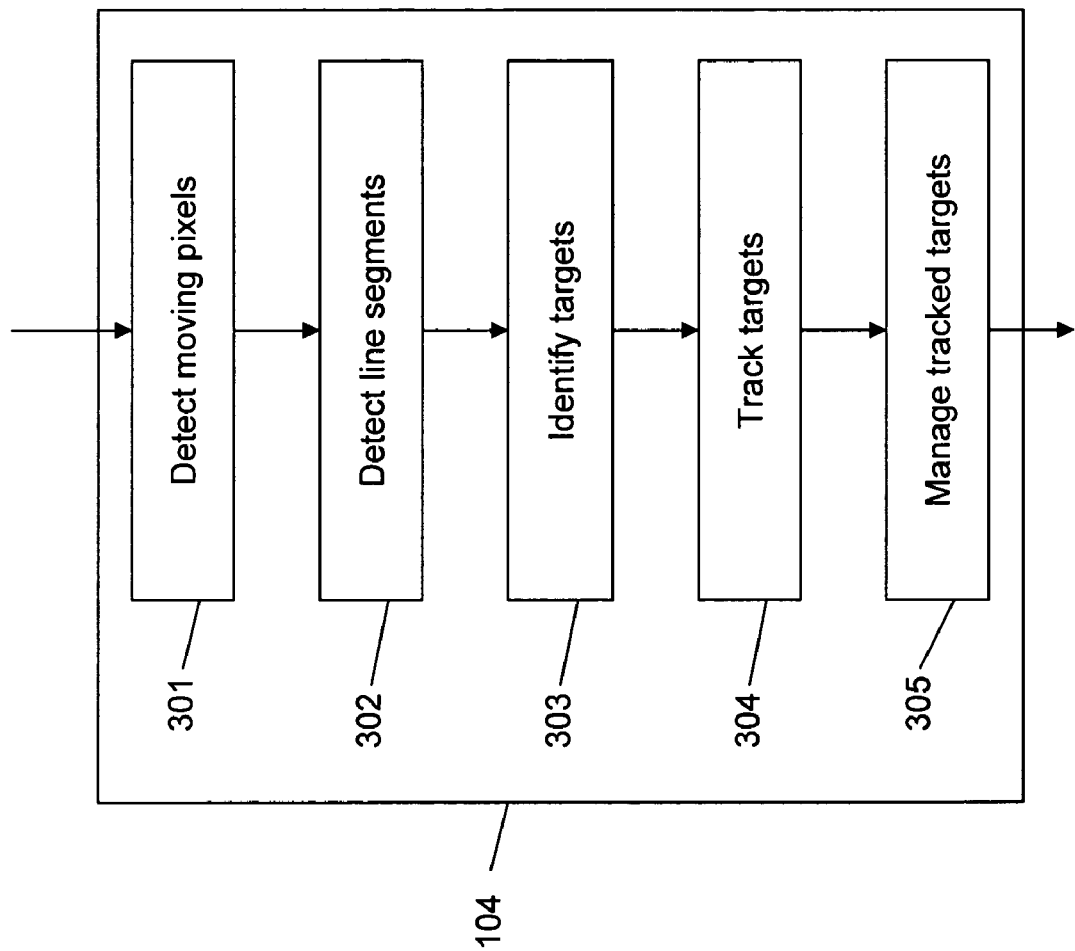
FIG. 3 illustrates a flow diagram for target detection and counting according to an exemplary embodiment of the invention.

FIG. 3 illustrates a flow diagram for target detection and counting according to an exemplary embodiment of the invention. With the invention, targets may be described using co-moving sets of line segments extracted from the video scene. To extract these sets of line segments, blocks 301 and 302 may be employed. In block 301, moving pixels may be detected in the video stream using, for example, three-frame differencing, or some other technique (see, for example, U.S. Pat. No. 6,625,310, "Video Segmentation Using Statistical Pixel Modeling," or U.S. patent application Ser. No. 10/354,096, "Video Scene Background Maintenance Using Change Detection and Classification," both of which are incorporated herein by reference), and a motion mask may be extracted. An exemplary embodiment of block 301 is discussed below with respect to FIG. 4. In block 302, line segments may be detected using, for example, edge detection and line growing technique (see, for example, U.S. patent application Ser. No. 11/113,275, "Line Textured Target Detection and Tracking with Applications to 'Basket-run' Detection," which is incorporated herein by reference). An exemplary embodiment of block 302 is discussed below with respect to FIGS. 5-7. In block 303, targets may be identified as sets of line segments that fit the requirements a normal target (e.g., approximate target shape and size), given the field of view of the video camera. In block 304, targets may be tracked using a tracking filter, such as a Kalman filter, applied to the centroids of the targets, or some other technique (see, for example, U.S. patent application Ser. No. 09/987,707, "Video Surveillance System Employing Video Primitives," or U.S. patent application Ser. No. 11/139,600, "Multi-State Target Tracking," filed May 31, 2005, both of which are incorporated herein by reference). An exemplary embodiment of block 304 is discussed below with respect to FIGS. 8-16.

Figure 4:
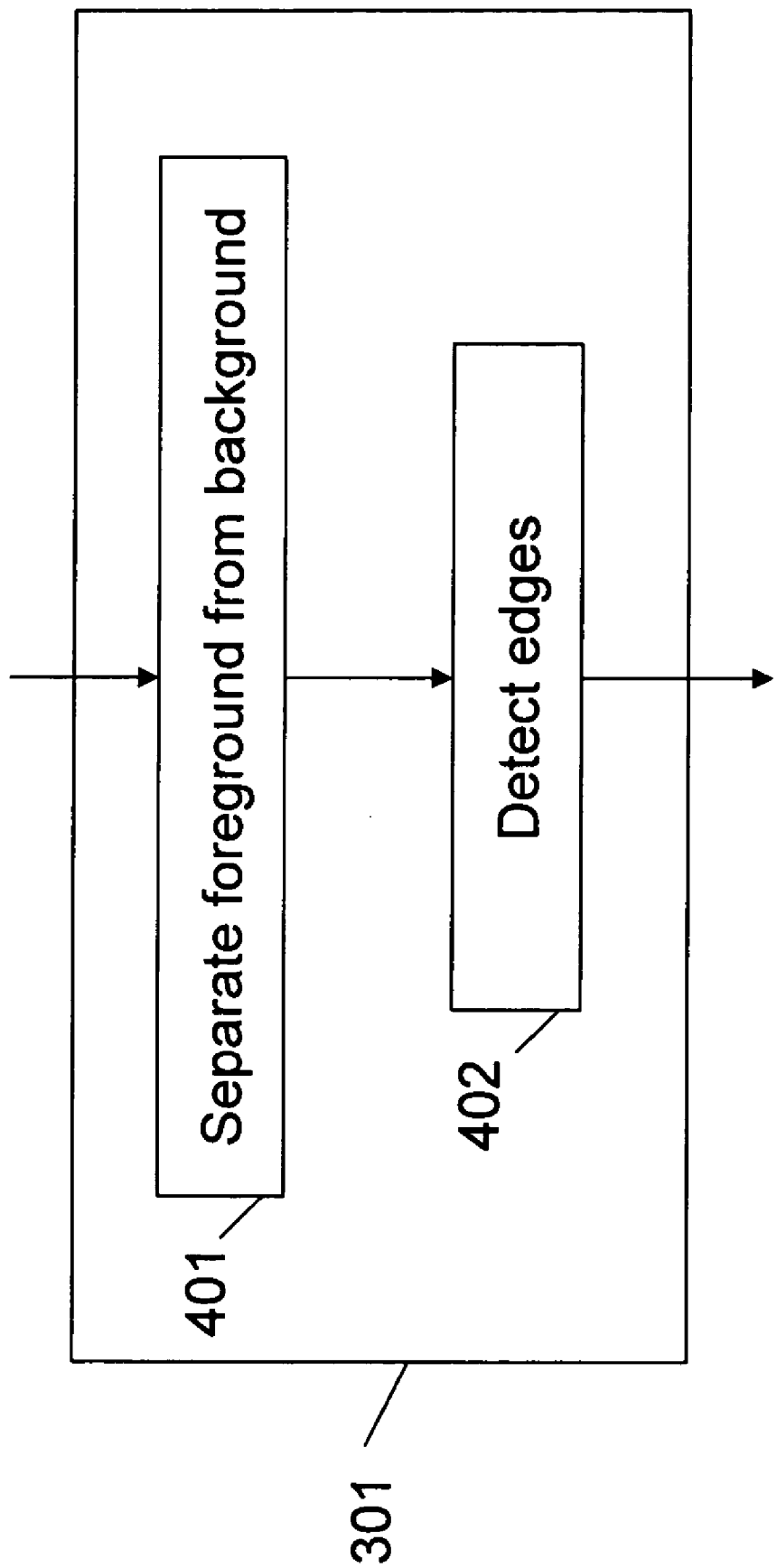
FIG. 4 illustrates a flow diagram for detecting moving pixels according to an exemplary embodiment of the invention.

FIG. 4 illustrates a flow diagram for detecting moving pixels in block 301 of FIG. 3 according to an exemplary embodiment of the invention. In block 401, the foreground moving area may be separated from the background scene. This separation may be performed using change detection. Change detection has been studied extensively in recent years, and many techniques are available. The output of the change detection may be a foreground mask for each frame. In block 402, the edges of each foreground mask may be detected. While other edge detection algorithms may be used, an exemplary embodiment of the invention may use the Canny edge detection, which produces single-pixel-width edges. The edge detection may be performed only on the foreground area, which may require some modifications to the Canny edge detector to incorporate the foreground mask information.

Figure 5:
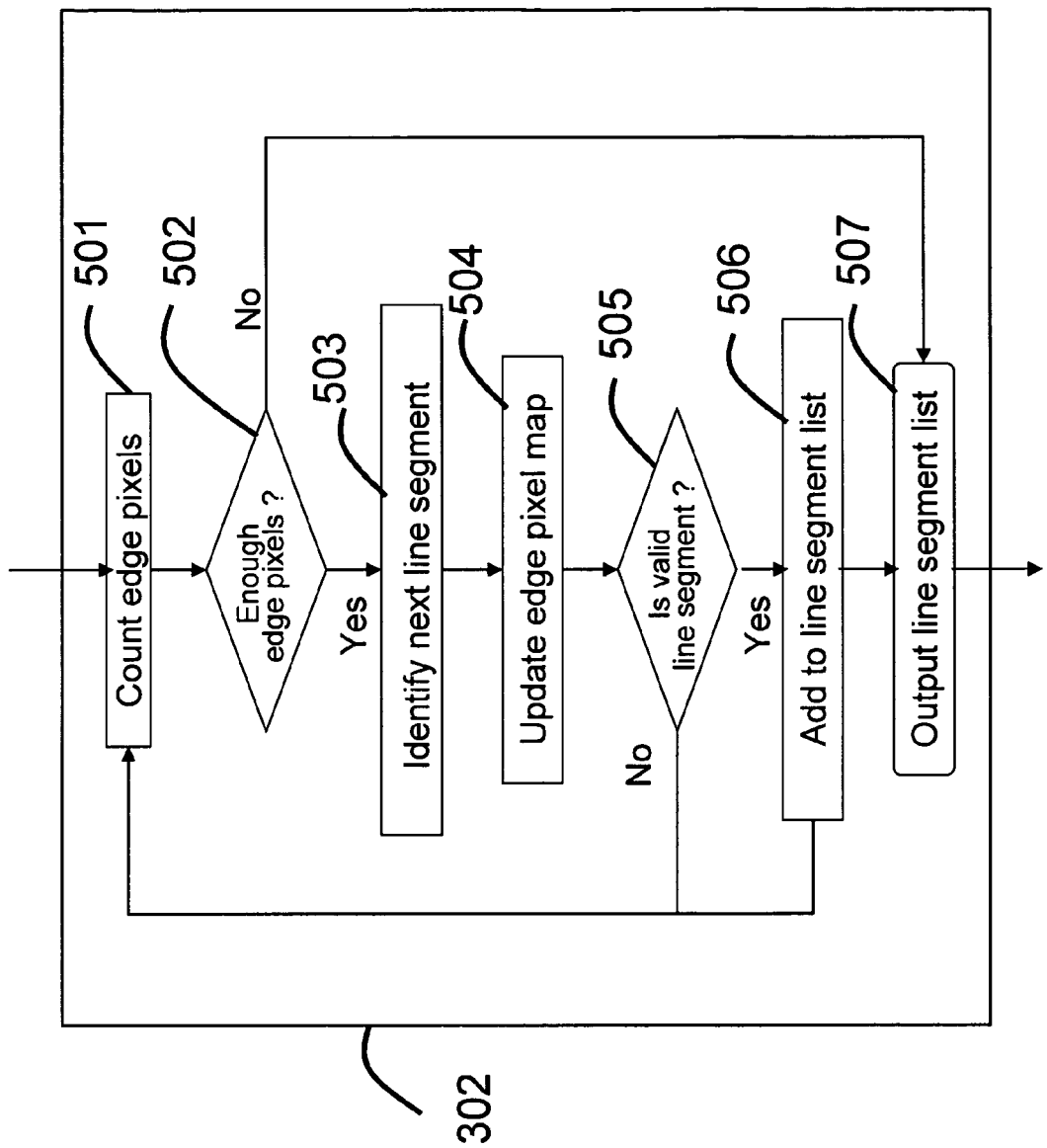
FIG. 5 illustrates a flow diagram for detecting line segments according to an exemplary embodiment of the invention.

FIG. 5 illustrates a flow diagram for detecting line segments in block 302 of FIG. 3 according to an exemplary embodiment of the invention. According to an exemplary embodiment, a deterministic method may be used to detect line segments by extracting all of the line segments from an edge pixel map. The method may iteratively search an edge pixel map to find a new line segment until there are not enough unused edge pixels remaining. Each edge pixel may only be in one line segment, and after being used, the edge pixel may be removed from the edge pixel map.

The input to block 501 may be an edge pixel map of the frame obtained by, for example, block 402 in FIG. 4. In block 501, edge pixels may be counted. In block 502, a determination may be made whether a sufficient number of edge pixels exist (or remain) to identify a line segment. The threshold to check this condition may be determined by user input parameters on the rough image size of an exemplary object, such as, for example, a shopping cart. For example, if the rough image width of a shopping cart is sixty pixels, the threshold on the sufficient remaining edge pixels may be, for example, one third of it, that is, twenty pixels. This threshold may be called the minimum line segment length threshold. If a sufficient number of edge pixels do not exist (or remain), flow may proceed to block 507; otherwise, flow may proceed to block 503. In block 503, a new line segment may be identified. An exemplary embodiment of block 503 is discussed below with respect to FIG. 6. In block 504, the edge pixel map may be updated to eliminate the pixels used in block 503, as noted above. In block 505, a determination may be made whether the new line segment is valid based on, for example, its length and linearity. For example, if the new line segment from block 503 has length much shorter than the image dimension of an expected shopping cart or if its overall linearity is too low, the new line segment may be considered as an invalid line segment. If the new line segment is not valid, the invalid line segment may be discarded, and flow may proceed to block 501; otherwise, flow proceeds to block 506. In block 506, the valid line segment may be added to a list of line segments in the frame. In block 514, the list of valid line segments may be outputted.

Figure 6:
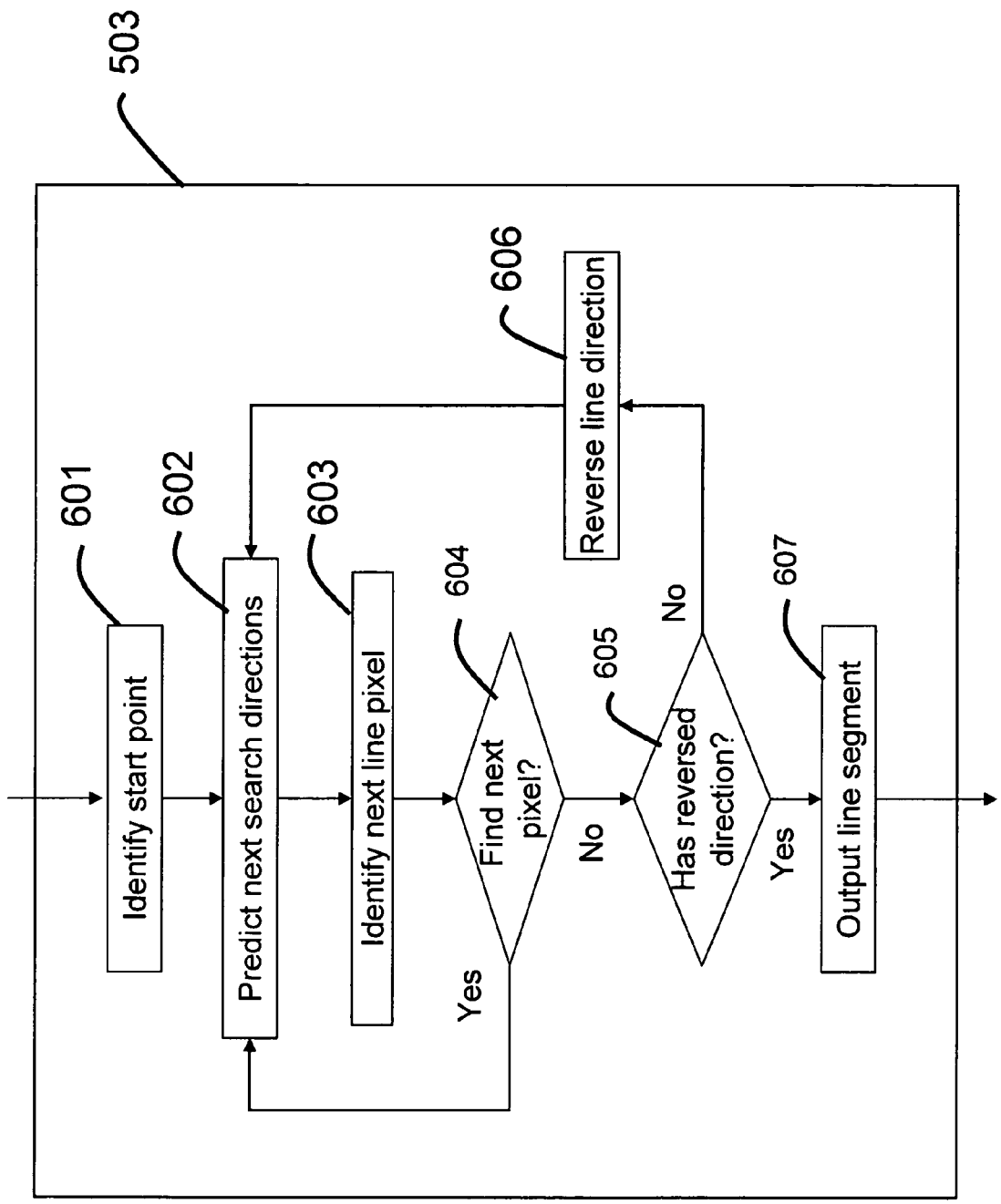
FIG. 6 illustrates a flow diagram for finding a next line segment according to an exemplary embodiment of the invention.

FIG. 6 illustrates a flow diagram for finding a next line segment in block 503 of FIG. 5 according to an exemplary embodiment of the invention. In block 601, a starting point of the new line segment is identified from a given edge pixel map. For the first line segment, this start point may be obtained by scanning through the whole edge pixel map from the top left corner until the first unused edge point is located. For all subsequent line segments, the search may be speeded up by using the start point of the preceding line segment as the scanning start position. In block 602, the next search directions may be predicted for the end point based on an estimated line direction. An exemplary embodiment of block 602 is discussed below with respect to FIG. 7. In block 603, the next line pixel may be identified by looping through each predicted search position to determine if the pixel is an edge pixel. In block 604, if the next line pixel is an edge pixel, the pixel may be added to the line segment as the new end point, and flow may proceed to block 602. Otherwise, the next line pixel may be searched for in both directions, and flow may proceed to block 605. In block 605, if the next line pixel can not be found in one direction, the reverse direction may have already been searched. If the reverse direction has not been searched, flow may proceed to block 606; otherwise, flow may proceed to block 607. In block 606, the search process may reverse the line direction. The end point may become the start point, the start point may become the current end point, and flow proceeds back to block 602. In block 607, the end of the search process on the current line segment may be reached, and the line segment may be outputted.

Figure 7:
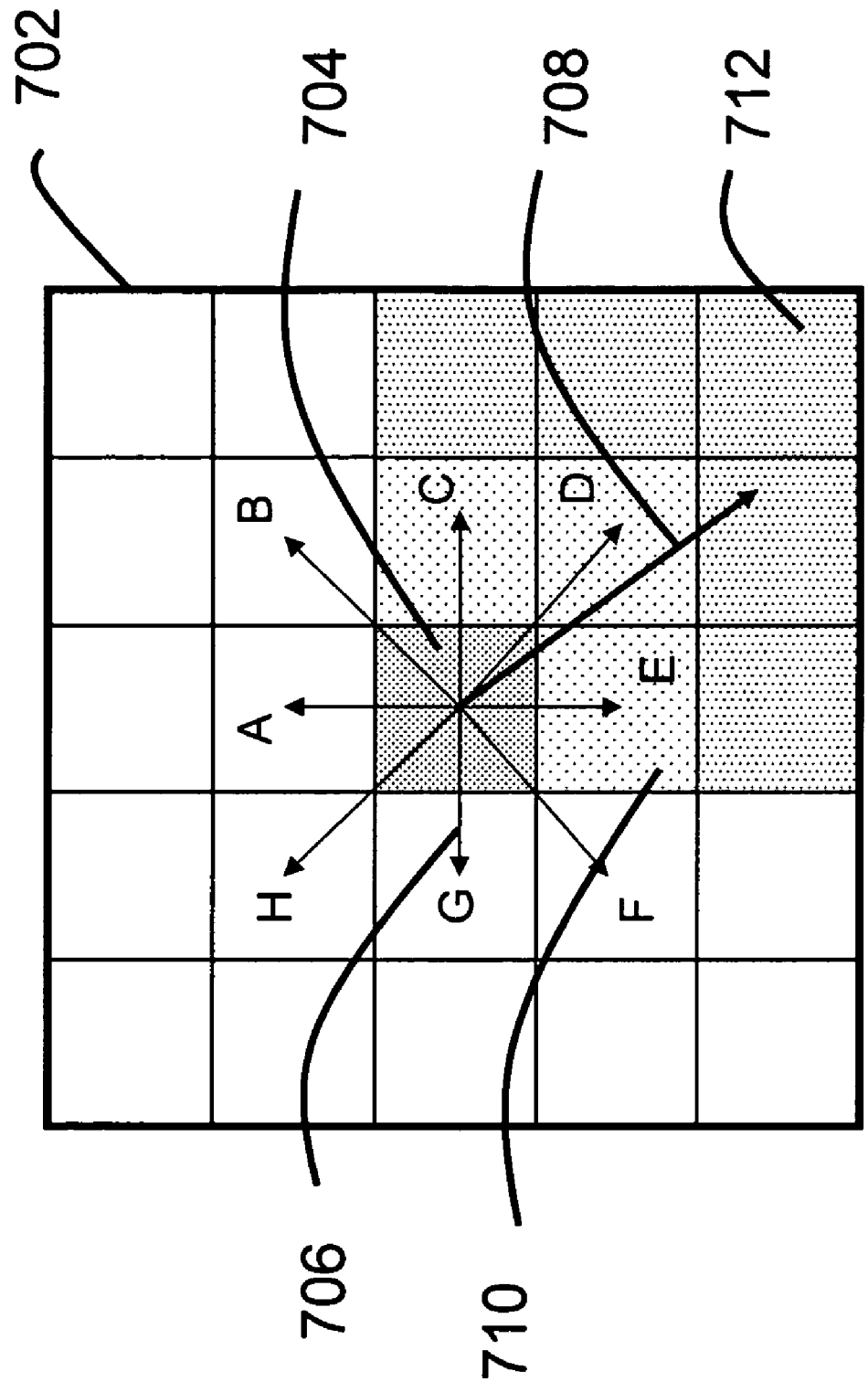
FIG. 7 illustrates predicting new search directions according to an exemplary embodiment of the invention.

FIG. 7 illustrates predicting new search directions in block 602 of FIG. 6 according to an exemplary embodiment of the invention. Area 702 may depict a region of an image, where each block indicates one pixel location. Area 704 may indicate the current end point pixel of the current line segment. Three different states may be considered when predicting the next search positions. For the first state (the initial pixel), the current end point pixel may also be the start point. In this case, all of the eight neighboring directions A-H of the end point pixel are searched as shown by reference numeral 706.

For the second state, once multiple pixels in a line segment exist, the direction of the line segment may be estimated using information provided by the pixels of the line segment. One way to determine the line direction may be to perform clustering of the line segment pixels into two groups, namely the starting pixels and the ending pixels, which may correspond to the first half and second half of the line segment, respectively. The line direction may then be determined by using the average locations of the two groups of pixels.

For the third state, when a current line direction is available, for example, as may be indicated by arrow 708, the top three directions may be selected, for example, C, D, and E, indicated by reference numeral 710, that have minimum angle distances from the line direction. Two further scenarios may be considered in this case. First, the line may not yet be long enough to become a consistent line segment, where it is unclear whether the list of pixels is a part of a line segment or just a cluster of neighboring edge pixels. One way to determine if the current line segment is sufficiently consistent may be to use the minimum length threshold discussed above. In particular, if the line segment is less than this threshold, the line segment may be considered not to be sufficiently consistent. To avoid extracting a false line segment, the three direct neighboring locations 710 may be included as the next search locations. Second, the line segment may be long enough and may be consistently extracted. In this case, a portion of the line may be missing due to an occasional small gap in the edge map caused by noise. Thus, further neighborhood search locations may be included as indicated by reference numeral 712.

Figure 8:
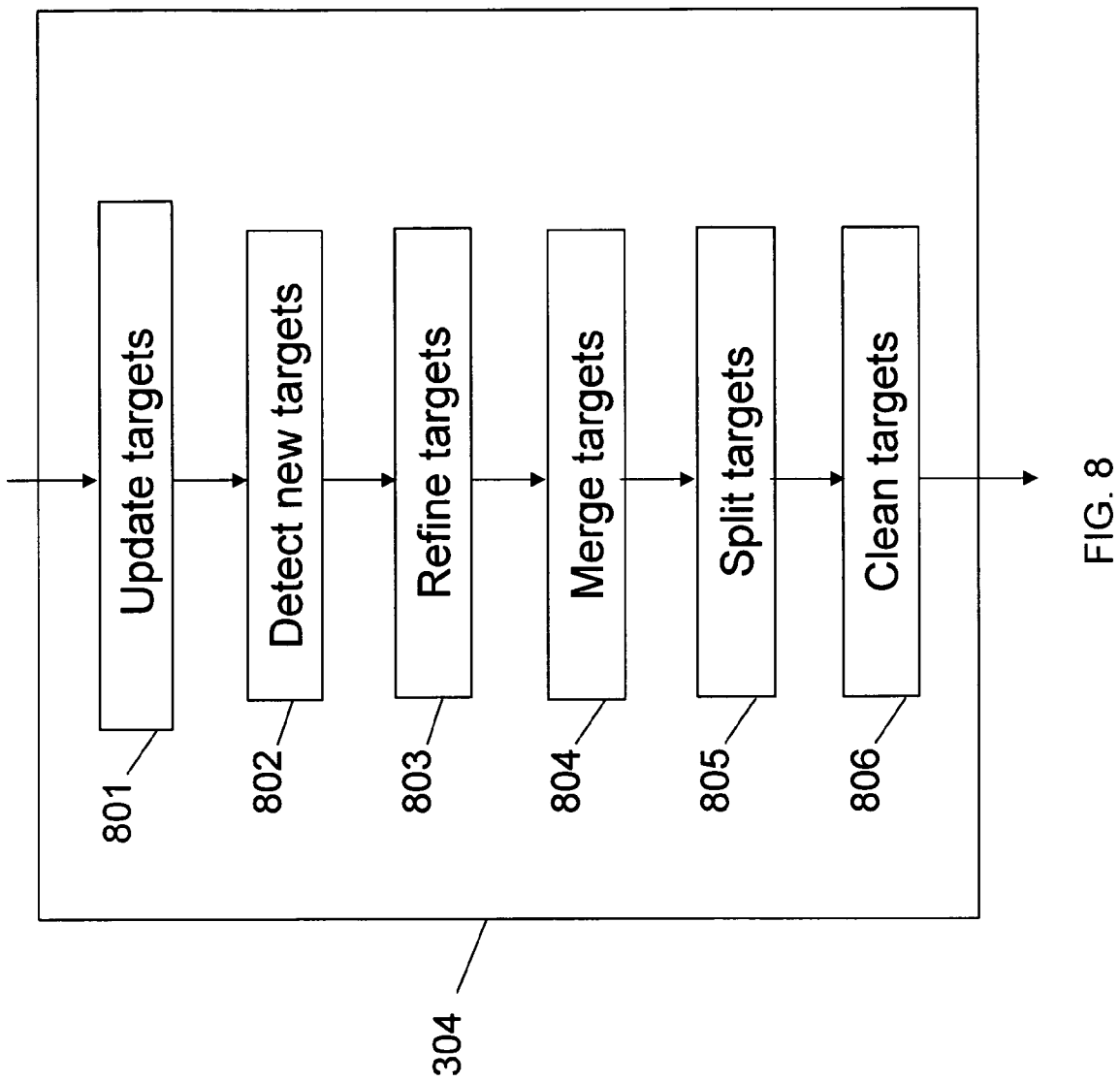
FIG. 8 illustrates a flow diagram for tracking targets according to an exemplary embodiment of the invention.

FIG. 8 illustrates a flow diagram for tracking targets in block 304 of FIG. 3 according to an exemplary embodiment of the invention. In block 801, existing targets may be updated as new information is received from frame to frame. An exemplary embodiment of block 801 is discussed below with respect to FIG. 9. In block 802, new targets may be recognized from any unassigned line segments that have not been deemed part of an existing target. An exemplary embodiment of block 802 is discussed below with respect to FIG. 10. In block 803, the targets may be refined to ensure that the available features may be accommodated. An exemplary embodiment of block 803 is discussed below with respect to FIG. 11. In block 804, the targets may be analyzed to determine if they should be merged (i.e., two targets become one target), and in block 805, the targets may be analyzed to determine if they should be split (i.e., one target becomes two targets). An exemplary embodiment of blocks 804 and 805 is discussed below with respect to FIGS. 12-15. In block 806, the targets are cleaned, which may be used to determine when a target has left the field of view of the video camera. An exemplary embodiment of block 806 is discussed below with respect to FIG. 16.

Figure 9:
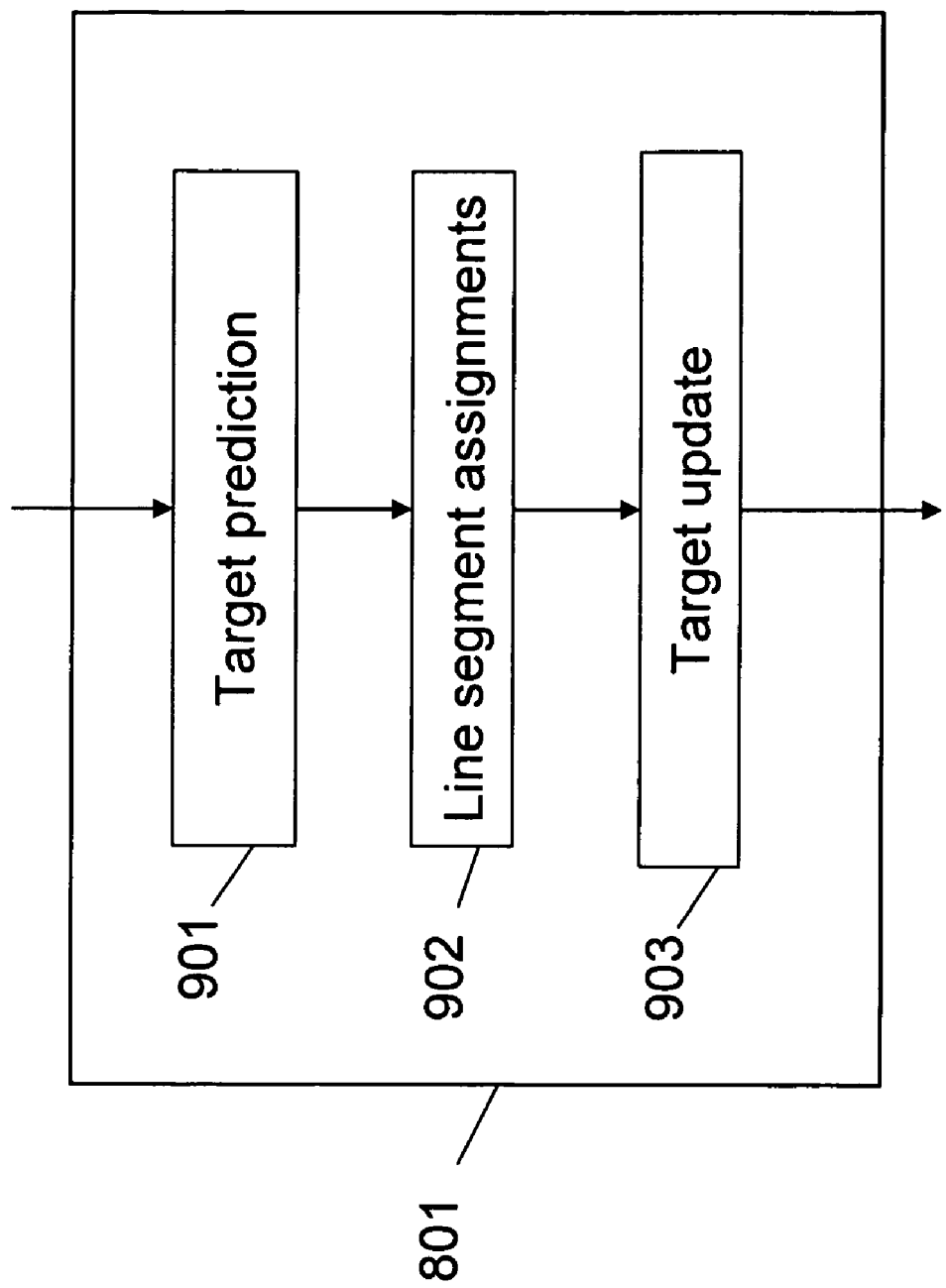
FIG. 9 illustrates a flow diagram for updating targets according to an exemplary embodiment of the invention.

FIG. 9 illustrates a flow diagram for updating targets in block 801 of FIG. 8 according to an exemplary embodiment of the invention. In block 901, the parameters (e.g., position and size, or position, size, and velocity) of existing targets may be predicted using an appropriate tracking filter, such as, for example, a Kalman filter or the another tracking filtering (see, for example, U.S. patent application Ser. No. 09/987, 707, "Video Surveillance System Employing Video Primitives," or U.S. patent application Ser. No. 11/139,600, "Multi-State Target Tracking," filed May 31, 2005. In block 902, the line segments that have been detected may be assigned to each of the targets based on their locations with respect to the centroid and size of the existing target. In block 903, the targets may be updated. For example, the target's new position, size and velocity may be updated according to the tracking filter update rules.

Figure 10:
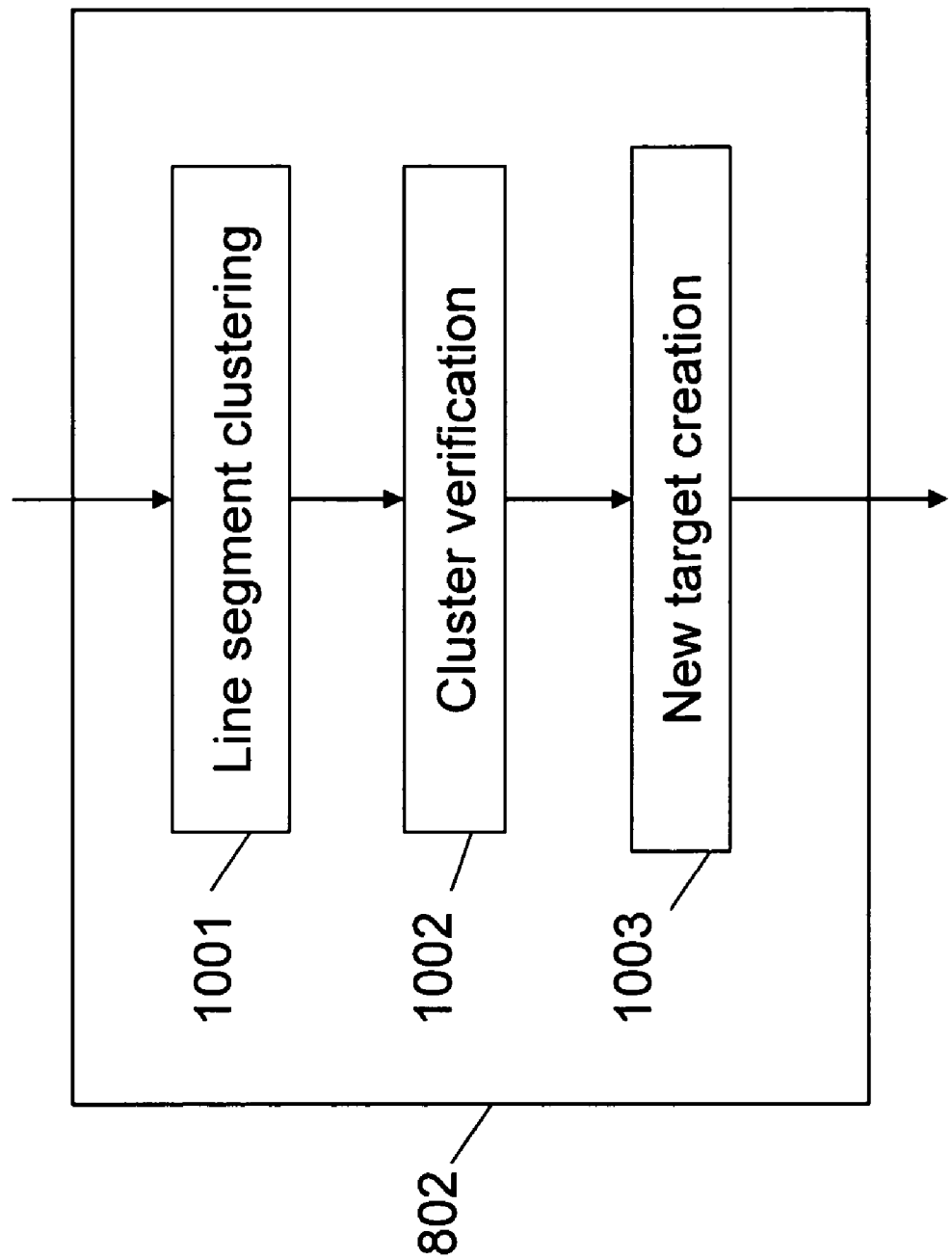
FIG. 10 illustrates a flow diagram for detecting new targets according to an exemplary embodiment of the invention.

FIG. 10 illustrates a flow diagram for detecting new targets in block 802 of FIG. 8 according to an exemplary embodiment of the invention. In block 1001, any unassigned line segments may be clustered using, for example, a neighborhood grouping method. For example, any line segments within a certain threshold of distance from each other may be clustered into a single group. In block 1002, the cluster of the unassigned line segments may be verified to make ensure they correspond to the pre-defined requirements of a target. For example, if a human target in the field of view of FIG. 2 is used to define the requirements of a target, the cluster of the unassigned line segments may need to have the correct approximate size to indicate the presence of a human target. If the cluster of the unassigned line segments is too large or too small, the cluster of the unassigned line segments may be rejected. In block 1003, assuming the cluster of the unassigned line segments fits the requirements of a target definition from block 1002, the cluster of unassigned line segments may be designated as a new target, and a tracking filter may be instantiated for the new target with the position and size of the cluster of unassigned line segments as the initial parameters for the new target.

Figure 11:
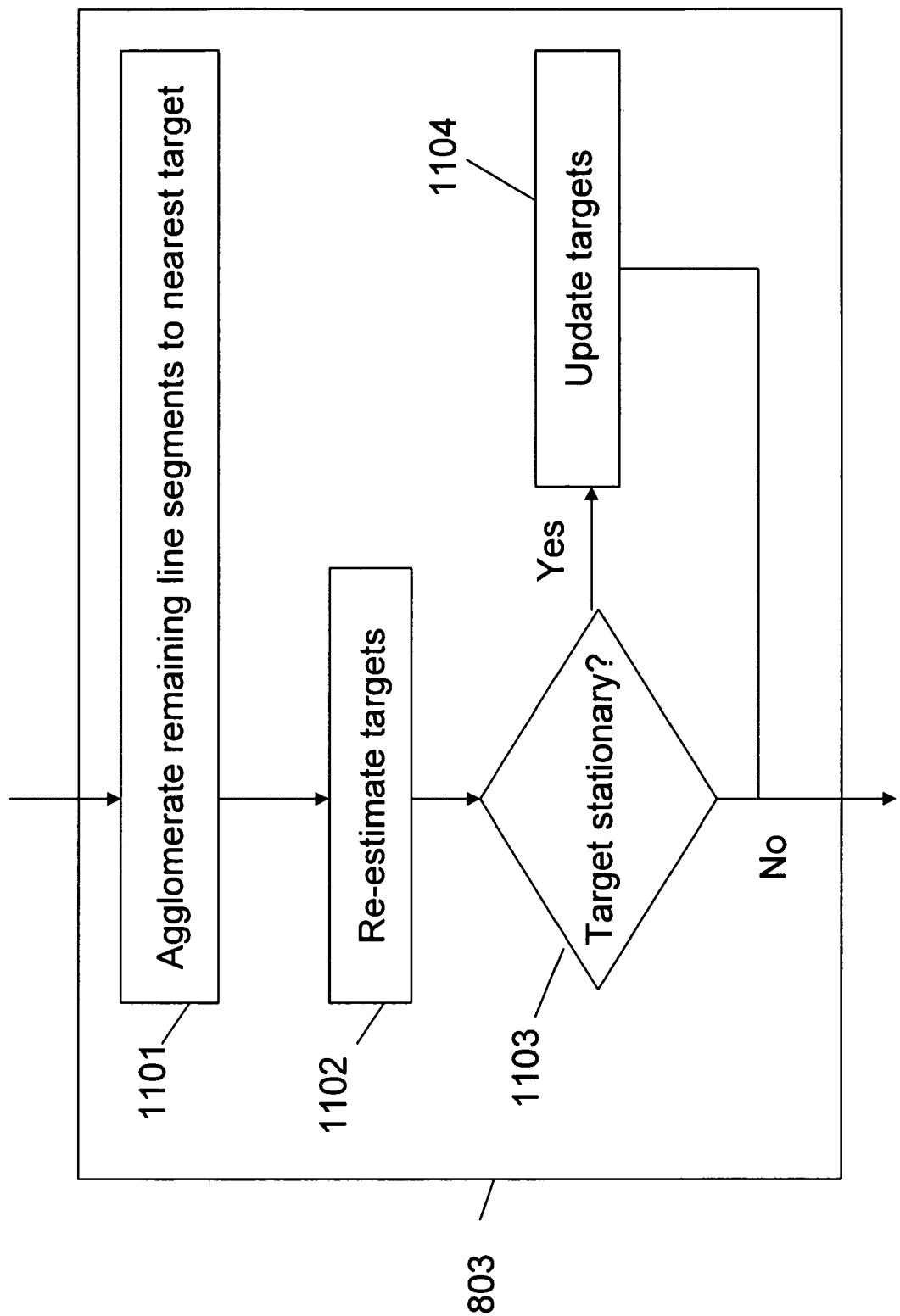
FIG. 11 illustrates a flow diagram for refining targets according to an exemplary embodiment of the invention.

FIG. 11 illustrates a flow diagram for refining targets in block 803 of FIG. 8 according to an exemplary embodiment of the invention. In block 1101, any remaining line segments that have not been assigned to existing or new targets may be agglomerated into their nearest neighbor target. In block 1102, the targets may be re-estimated based on the new features. For example, the position and velocity of the targets may be re-calculated, and the associated tracking filter may be updated with these new parameters. In block 1103, a determination may be made as to whether or not each target is becoming stationary (i.e., stops moving). If the number and size of line segments associated with that target decreases, the target may be ceasing motion. If the target is determined to becoming stationary, flow proceeds to block 1104; otherwise, flow may exit from block 803. In block 1104, the target's parameters (e.g., size, position, and velocity) may be updated using all (or some) of the moving pixels in the target's vicinity rather than just the moving line segments.

Figure 12:
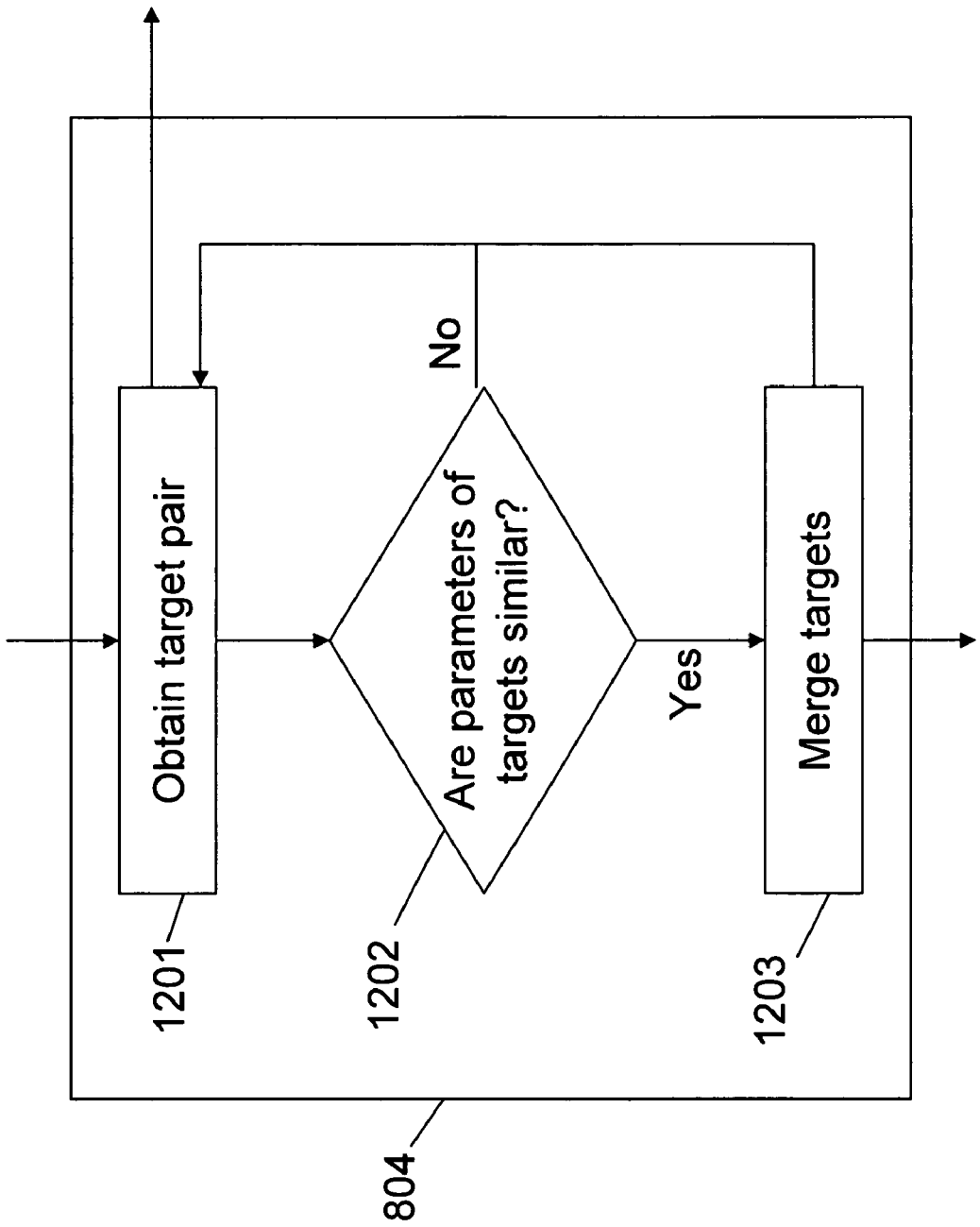
FIG. 12 illustrates a flow diagram for merging targets according to an exemplary embodiment of the invention.

FIG. 12 illustrates a flow diagram for merging targets in block 804 of FIG. 8 according to an exemplary embodiment of the invention. In block 1201, two targets may be obtained. In block 1202, the parameters of the obtained targets may be compared. For example, the size and history (or age) of the targets may be compared. If the two targets occupy similar space, one is smaller than the other, and one is younger than the other, the two targets may be deemed similar enough to be merged into a single target. If the parameters of the targets are similar, flow may proceed to block 1203; otherwise, flow may proceed to block 1201. In block 1203, the two target may be merged into a single target. For example, the smaller and/or younger target may be merged into the larger one. After block 1203, flow may proceed to block 1201. For flow returning to block 1201, two targets may be obtained that have not been compared previously. Flow may exit block 804 once all (or a sufficient number) of targets have been compared for merger.

Figure 13:
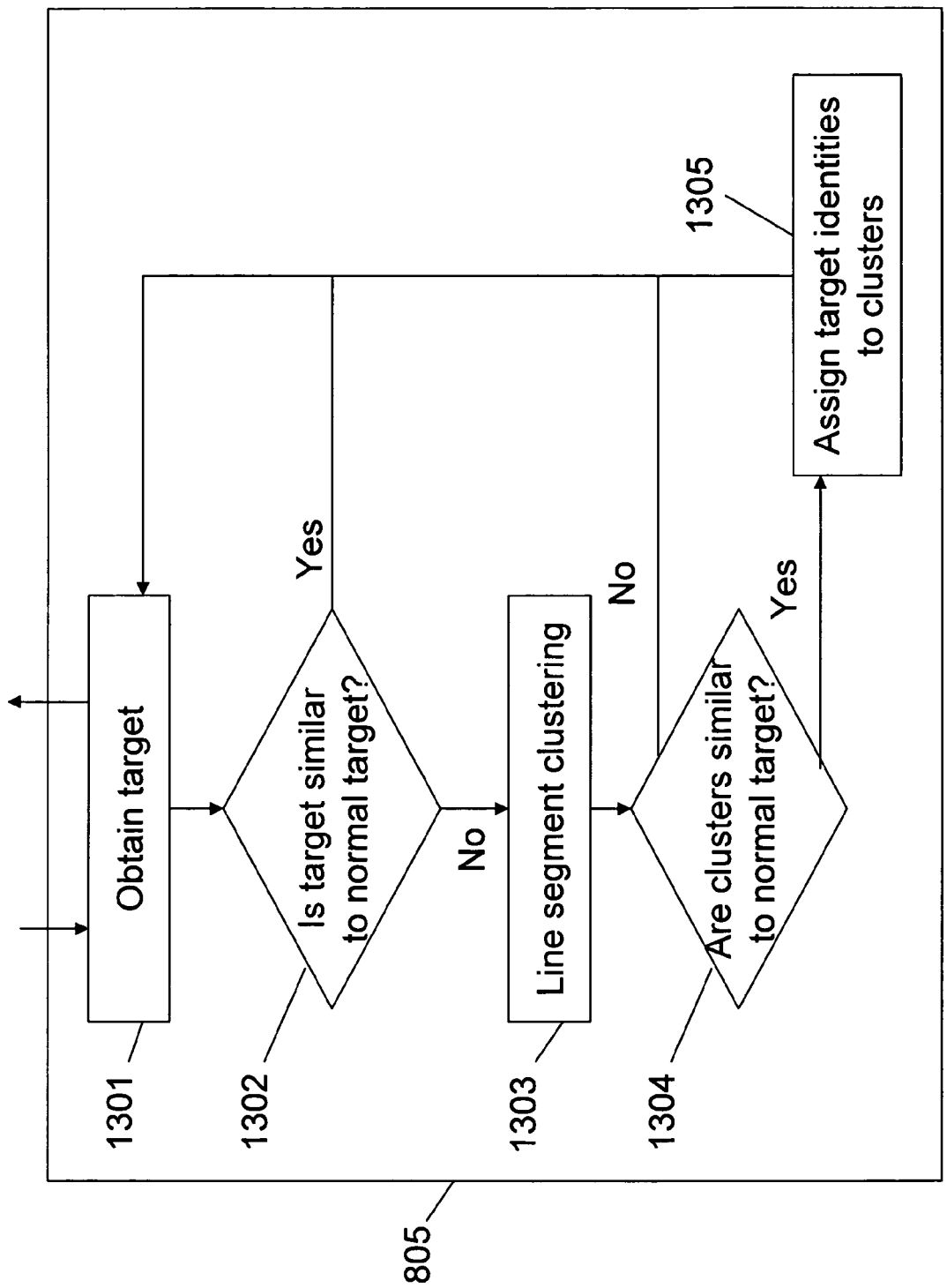
FIG. 13 illustrates a flow diagram for splitting targets according to an exemplary embodiment of the invention.

FIG. 13 illustrates a flow diagram for splitting targets in block 805 of FIG. 8 according to an exemplary embodiment of the invention. In block 1301, a target may be obtained. In block 1302, a determination may be made whether the target is similar to a normal target. For example, the normal target may be modeled after a person in FIG. 2. If the target and normal target are compared based on, for example, their sizes, and if the target is larger than the normal target, the target may be determined not to be similar to the normal target. If the target is not similar to the normal target, flow may proceed to block 1303; otherwise, flow may proceed to block 1301. In block 1303, clusters may be obtained from the line segments of the target. For example, two line segments that are furthest away from each other within the target may be identified, and clustering may be re-initialized (as in block 1001 of FIG. 10) with both of these line segments as the starting points. The result may be two new clusters of line segments. In block 1304, a determination may be made whether the two new clusters of line segments are similar to the normal target. For example, if the resulting two clusters are of appropriate size and shape when compared to the normal target, the two clusters may be considered individual targets. If the two new clusters of line segments are similar to the normal target, flow may proceed to block 1305; otherwise, flow may proceed to block 1301. In block 1305, target identities may be assigned to the two new clusters of line segments. For example, the smaller cluster may be assigned a new identity, and the larger cluster may maintain the original identity of the target. From block 1305, flow may proceed to block 1301. Flow may exit block 805 once all (or a sufficient number) of targets have been analyzed for splitting.

Figure 14:
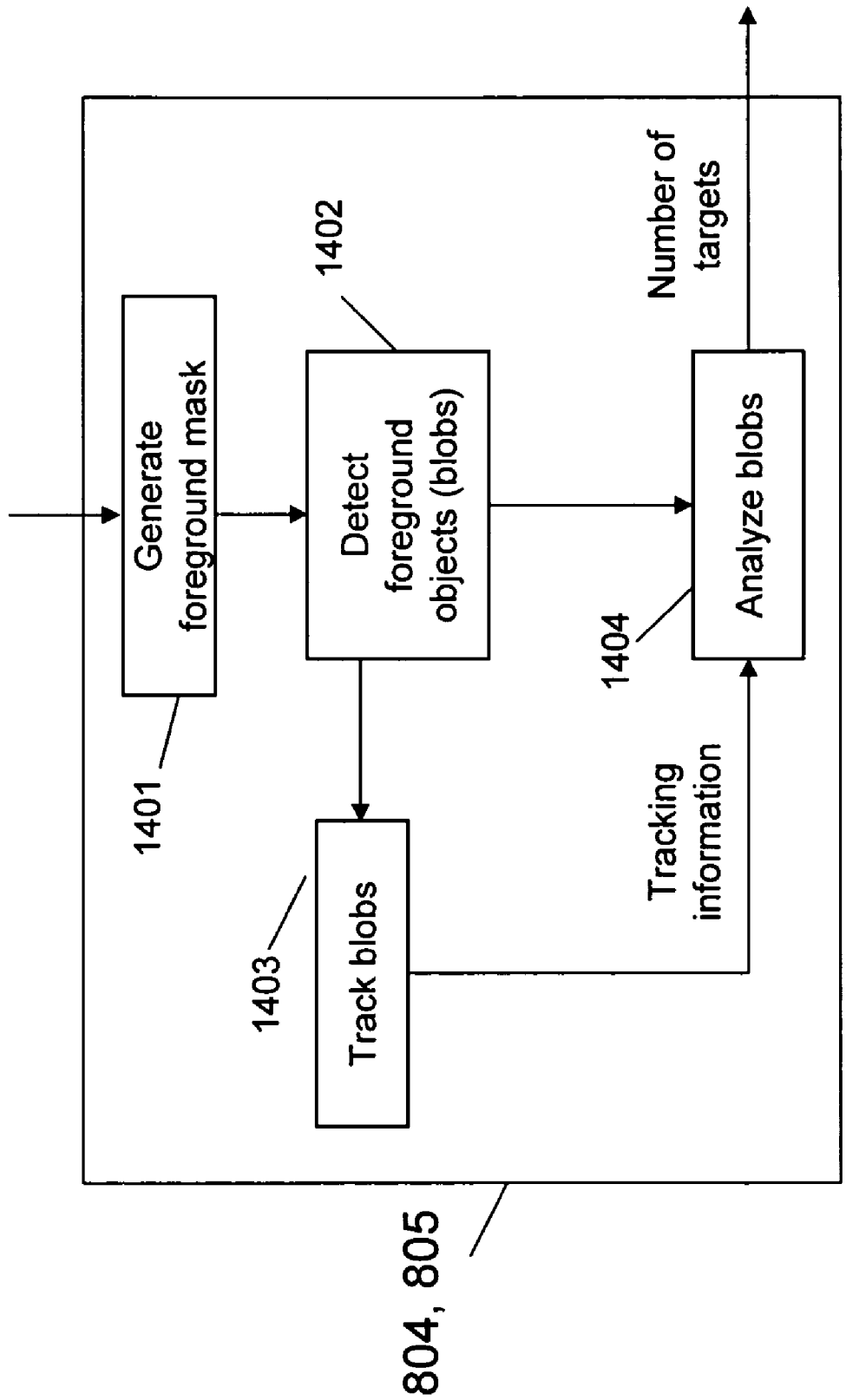
FIG. 14 illustrates a flow diagram for merging and splitting targets according to an exemplary embodiment of the invention.

As an alternative to the techniques discussed with respect to FIGS. 12 and 13, the merging and splitting of targets may be considered simultaneously and may be based on, for example, the analysis of the shape of the moving target blob. For example, with reference to FIG. 2, the analysis may result in labeling the number of human targets in a blob as "no targets," "one human target," or ">1 human targets." Other embodiments might seek to count specific targets in a group. FIG. 14 illustrates a flow diagram for merging and splitting targets in blocks 804 and 805 of FIG. 8 according to an exemplary embodiment of the invention. In block 1401, a foreground mask may be generated for each video frame. This foreground mask may be generated using the detection of moving pixels discussed for block 301 of FIG. 3 or another foreground object detection technique (see, for example, U.S. Pat. No. 6,625,310, "Video Segmentation Using Statistical Pixel Modeling," U.S. patent application Ser. No. 09/987,707, "Video Surveillance System Employing Video Primitives," U.S. patent application Ser. No. 11/057,154, "Video Surveillance System," or U.S. patent application Ser. No. 11/098,385, "Video Surveillance System Employing Video Primitives," all of which are incorporated herein by reference).

In block 1402, foreground objects (i.e., blobs) may be detected within the motion mask generated in block 1401. The foreground objects may be detected using a clustering algorithm (see, e.g., U.S. patent application Ser. No. 09/987,707, "Video Surveillance System Employing Video Primitives," U.S. patent application Ser. No. 11/057,154, "Video Surveillance System," or U.S. patent application Ser. No. 11/098,385, "Video Surveillance System Employing Video Primitives."

Optionally, in block 1403, the blobs may be tracked via an object tracking algorithm and tracking information may be generated (see, e.g., U.S. patent application Ser. No. 09/987,707, "Video Surveillance System Employing Video Primitives," U.S. patent application Ser. No. 11/057,154, "Video Surveillance System," U.S. patent application Ser. No. 11/098,385, "Video Surveillance System Employing Video Primitives," or U.S. patent application Ser. No. 11/139,600, "Multi-State Target Tracking," filed May 31, 2005. Block 1403 may be optional.

From blocks 1402 and 1403, flow may proceed to block 1404. In block 1404, the blobs from block 1402 and the tracking information from block 1403 may be used to analyze the blobs, and the number of targets may be identified. For example, the blobs may be analyzed based on their size and shape. An exemplary embodiment of block 1403 is discussed below with respect to FIG. 14. The result of block 1404 may be targets that are the same as previous targets, less than the previous targets (i.e., a merger of previous targets), or more than the previous targets (i.e., a split of previous targets).

Figure 15:
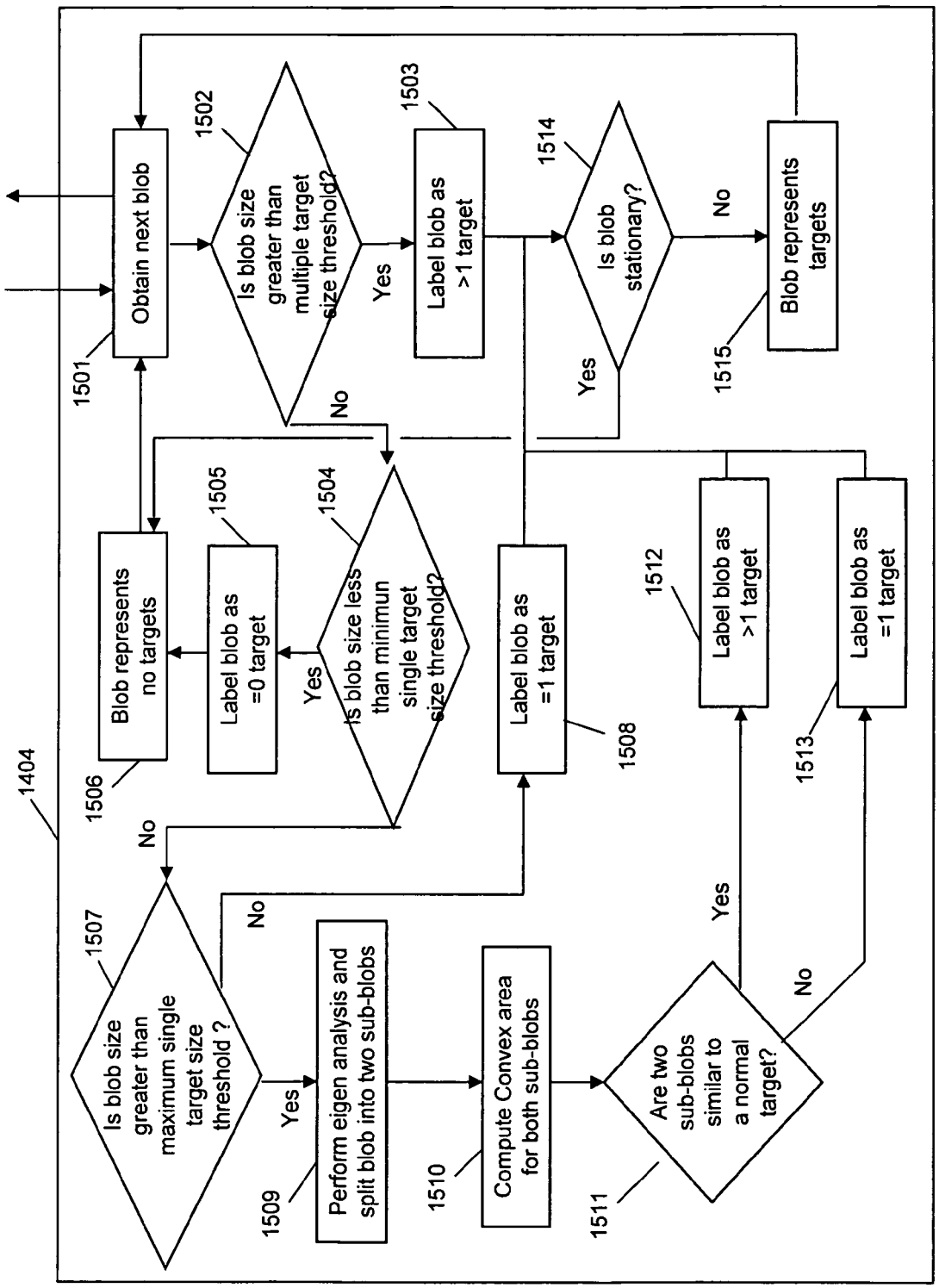
FIG. 15 illustrates a flow diagram for analyzing blobs according to an exemplary embodiment of the invention.

FIG. 15 illustrates a flow diagram for analyzing blobs in block 1404 of FIG. 14 according to an exemplary embodiment of the invention. In block 1501, the flow may be performed for each blob identified in block 1302. Flow may exit block 1404 once all (or a sufficient number) of blobs have been analyzed. In block 1502, the size of the blob may be compared to a multiple target size threshold. For example, the multiple target size threshold may represent a size representing two or more normal targets (e.g., two or more humans). If the size of the blob is greater than the multiple target size threshold, flow may proceed to block 1503; otherwise, flow may proceed to block 1504. In block 1503, the size of the blob may be greater than or equal to the multiple target size threshold, and the blob may be labeled as more than one target (e.g., labeled as ">1 human").

In block 1504, the size of the blob may be compared to a minimum single target size threshold. The minimum single target size threshold may represent a minimum size of a normal target. If the size of the blob is less than the minimum target size threshold, flow may proceed to block 1505; otherwise, flow may proceed to block 1507. In block 1505, the size of the blob may be less than the minimum single target size threshold, and the blob may be labeled as no target (e.g., labeled as "=0 human"). In block 1506, the blob may be designated as representing no targets.

In block 1507, the size of the blob may be compared to a maximum single target size threshold. The maximum single target size threshold may represent an expected maximum size of a normal target. If the size of the blob is less than the maximum single target size threshold, flow may proceed to block 1508; otherwise, flow may proceed to block 1509. In block 1508, the size of the blob may be less than the maximum single target size threshold, and the blob may be labeled as one target (e.g., labeled as "=1 human").

If flow proceeds to block 1509, the size of the blob may be less than or equal to the multiple target size threshold but greater than the maximum single target size threshold, and additional analysis may be needed to determine the number of targets represented by the blob (i.e., no targets or one target). In block 1509, eigen analysis may be performed to determine the major and minor axes of the blob. The blob may then be split along its minor axis into two sub-blobs. In block 1510, the convex area (e.g., the area of the convex hull) of each sub-blob may be determined.

In block 1511, the sub-blobs may be analyzed to determine if the each of the two sub-blobs conforms to the normal target. For example, the two sub-blobs may be analyzed to determine if their shape is similar to the shape of the normal target. The following analysis may be performed: if the ratio of the of each sub-blob's area to its convex hull area is greater than a minimum target solidity threshold, and if the convex area of each sub-blob is greater than the minimum single target size threshold, then the original blob may be considered to comprise two targets, and flow may proceed to block 1512; otherwise, flow may proceed to block 1513. In block 1512, the blob may be considered to comprise two targets, and the blob may be labeled as more than one target (e.g., labeled as ">1 human"). In block 1513, the blob may be considered to comprise one target, and the blob may be labeled as one target (e.g., labeled as "=1 human").

In block 1514, flow may be received from blocks 1503, 1508, 1512, and 1513, and the blob may be analyzed to determine if it is stationary. To determine if the blob is stationary, a technique such as those described in, for example, U.S. patent application Ser. No. 10/354,096, "Video Scene Background Maintenance Using Change Detection and Classification," or U.S. patent application Ser. No. 11/139,600, "Multi-State Target Tracking," filed May 31, 2005, may be used for this purpose. If the blob is stationary, flow may proceed to block 1515; otherwise, flow may proceed to block 1506. In block 1515, the blob may be designated as represented no targets.

Figure 16:
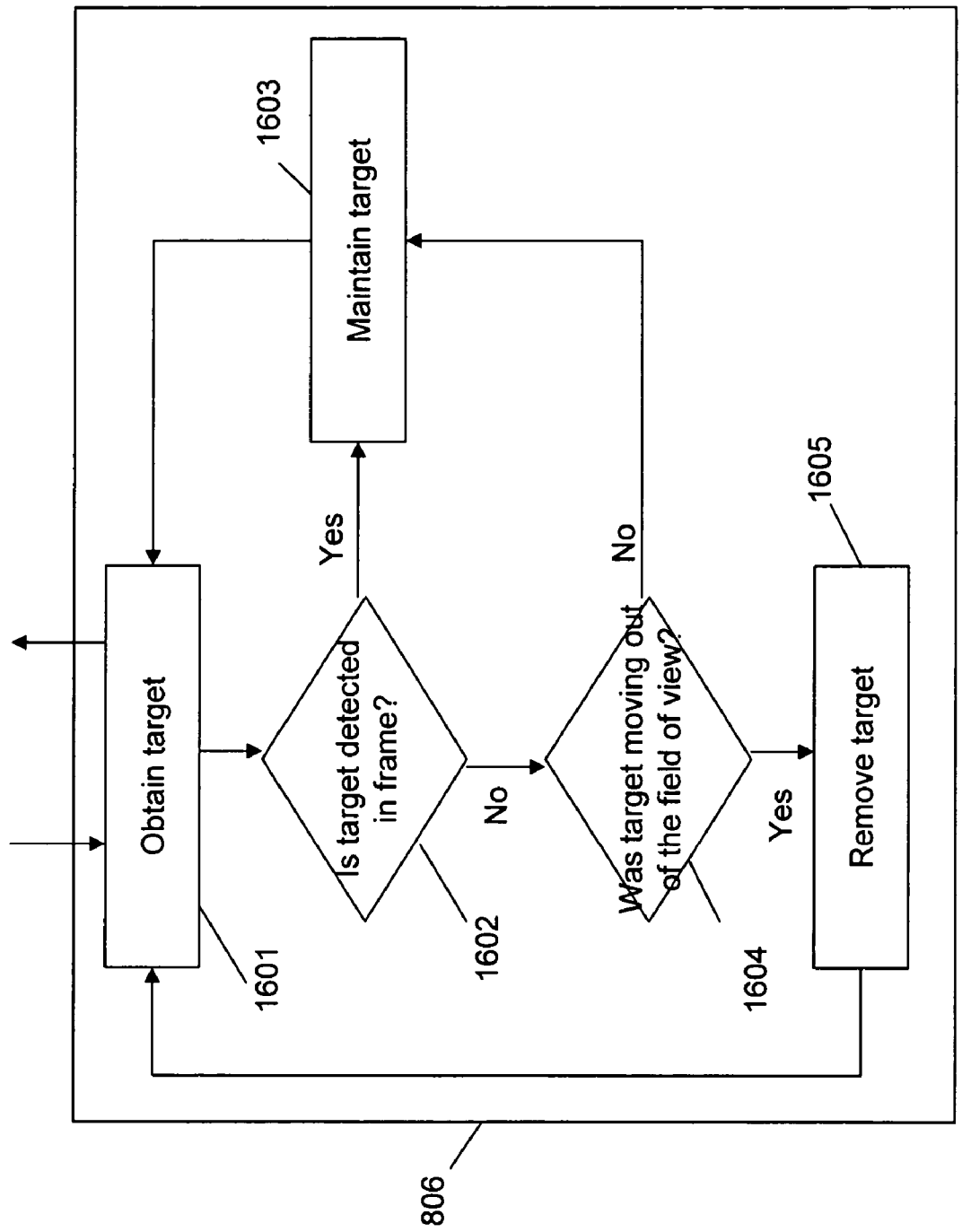
FIG. 16 illustrates a flow diagram for cleaning targets according to an exemplary embodiment of the invention.

FIG. 16 illustrates a flow diagram for cleaning targets in block 806 of FIG. 8 according to an exemplary embodiment of the invention. In FIG. 16, each target may be analyzed individually. In block 1601, a target may be obtained. In block 1602, the target may be analyzed to determine if the target was detected in the frame. If the target was detected in the frame, flow may proceed to block 1603; otherwise, flow may proceed to block 1604. In block 1603, the target may be detected in the frame and may be maintained. In block 1604, the target may be analyzed to determine if the target was moving out of the field of view of the video camera in a prior frame. If the target was not moving out of the field of view, flow may proceed to block 1603, and the target is maintained; otherwise, flow may proceed to block 1605. In block 1605, the target may not be detected in the frame, may have been moving out of the field of view, and may be removed from the list of current targets. Flow may exit block 806 once all (or a sufficient number) of targets have been analyzed for cleaning.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A non-transitory computer-readable medium comprising software for video processing, which when executed by a computer system, cause the computer system to perform operations comprising a method of:
   receiving video from an overhead view of a scene;
   detecting moving pixels in the video;
   detecting line segments in a foreground of the scene in the video based on detected moving pixels;
   identifying targets in the video based on the detected line segments;
   tracking targets in the video based on the identified targets; and
   managing tracked targets in the video, wherein detecting line segments comprises:
   counting edge pixels; and
   identifying a line segment based on the edge pixels.

2. A computer-readable medium as in claim 1, wherein detecting moving pixels comprises:
   separating the foreground in the video from background in the video; and
   detecting foreground edges in the video.

3. A computer-readable medium as in claim 1, wherein identifying the line segment comprises:
   identifying a start point;
   predicting next search directions;
   identifying a next line pixel; and
   providing a line segment.

4. A computer-readable medium as in claim 1, wherein identifying targets comprises:
   updating existing targets;
   detecting new targets;
   refining the new targets;
   merging the existing targets and the new targets;
   splitting the existing targets and the new targets; and
   cleaning the existing targets and the new targets.

5. A computer-readable medium as in claim 4, wherein updating targets comprises:
   predicting a target on its new location;
   assigning detected line segments to the predicted target; and
   updating the target.

6. A computer-readable medium as in claim 4, wherein detecting new targets comprises:
   performing line segment clustering;
   performing cluster verification based on the line segment clustering; and
   generating a new target based on the cluster verification.

7. A computer-readable medium as in claim 4, wherein refining the new targets comprises:
   agglomerating remaining line segments to nearest targets;
   re-estimating the targets; and
   updating the targets.

8. A computer-readable medium as in claim 4, wherein merging the existing targets and the new targets comprises:
   obtaining a target pair; and
   merging the target pair if parameters of the target pair are similar.

9. A computer-readable medium as in claim 4, wherein splitting the existing targets and the new targets comprises:
   obtaining a target;
   performing line clustering on the obtained target if the obtained target is not similar to a normal target to obtain clusters; and
   assigning a target identities to the clusters if the clusters are similar to the normal target.

10. A computer-readable medium as in claim 4, wherein merging and splitting the existing targets and the new targets comprises:
    generating a foreground mask;
    detecting foreground objects based on the foreground mask; and
    analyzing the foreground objects to obtain a number of targets.

11. A computer-readable medium as in claim 10, wherein analyzing the foreground objects is based on comparing the foreground objects to a multiple target size threshold, a minimum single target size threshold, and a maximum single target size threshold.

12. A computer-readable medium as in claim 4, wherein cleaning the existing targets and the new targets comprises:
    obtaining a target;
    maintaining the obtained target if the obtained target is detected in a current frame or was not moving out of a field of view of the video camera; and
    removing the obtained target if the obtained target is not detected in a current frame and was moving out of a field of view of the video camera.

* * * * *